US010831267B1

(12) United States Patent
Golard et al.

(10) Patent No.: US 10,831,267 B1
(45) Date of Patent: Nov. 10, 2020

(54) SYSTEMS AND METHODS FOR VIRTUALLY TAGGING OBJECTS VIEWED BY FRIENDS AND INFLUENCERS

(71) Applicant: Facebook Technologies, LLC, Menlo Park, CA (US)

(72) Inventors: Andre Golard, Seattle, WA (US); Bo Asp Andersen, Seattle, WA (US); Immo Andreas Schuetz, Redmond, WA (US); Karol Constantine Hatzilias, Kenmore, WA (US); Kelly Ingham, Redmond, WA (US); Martin Henrik Tall, Redwood City, CA (US); Neeraj Choubey, Belmont, CA (US); Sharvil Shailesh Talati, Mercer Island, WA (US); Robert Dale Cavin, Seattle, WA (US); Thomas Scott Murdison, Kirkland, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

(21) Appl. No.: 16/296,175

(22) Filed: Mar. 7, 2019

(51) Int. Cl.
*G06F 3/01* (2006.01)
*G06T 19/00* (2011.01)
*G06F 3/0346* (2013.01)

(52) U.S. Cl.
CPC .............. *G06F 3/013* (2013.01); *G06T 19/00* (2013.01); *G06F 3/011* (2013.01); *G06F 3/012* (2013.01); *G06F 3/0346* (2013.01); *G06T 2219/004* (2013.01)

(58) Field of Classification Search
CPC .......... G06F 3/011; G06F 3/012; G06F 3/013; G06F 3/0346
See application file for complete search history.

(56) References Cited

U.S. PATENT DOCUMENTS

| 8,996,510 | B2 * | 3/2015 | Karmarkar | G06F 16/95 707/722 |
| 10,395,072 | B2 * | 8/2019 | Nguyen | G06K 7/10297 |
| 2017/0160800 | A1 * | 6/2017 | Reunamaki | G06F 3/012 |

* cited by examiner

Primary Examiner — Vijay Shankar
(74) Attorney, Agent, or Firm — FisherBroyles, LLP

(57) ABSTRACT

The disclosed computer-implemented method may include (i) determining, using an eye-tracking system, an orientation of at least one eye of a user, (ii) identifying, based at least in part on the orientation of the user's eye, a point of interest within a field of view of the user, (iii) determining that the point of interest is a candidate for tagging, and (iv) performing, in response to determining that the point of interest is the candidate for tagging, a tagging action that facilitates tagging of the point of interest. Various other methods, systems, and computer-readable media are also disclosed.

20 Claims, 10 Drawing Sheets

US 10,831,267 B1

SYSTEMS AND METHODS FOR VIRTUALLY TAGGING OBJECTS VIEWED BY FRIENDS AND INFLUENCERS

BRIEF DESCRIPTION OF THE DRAWINGS

The accompanying drawings illustrate a number of example embodiments and are a part of the specification. Together with the following description, these drawings demonstrate and explain various principles of the instant disclosure.

Figure 1:
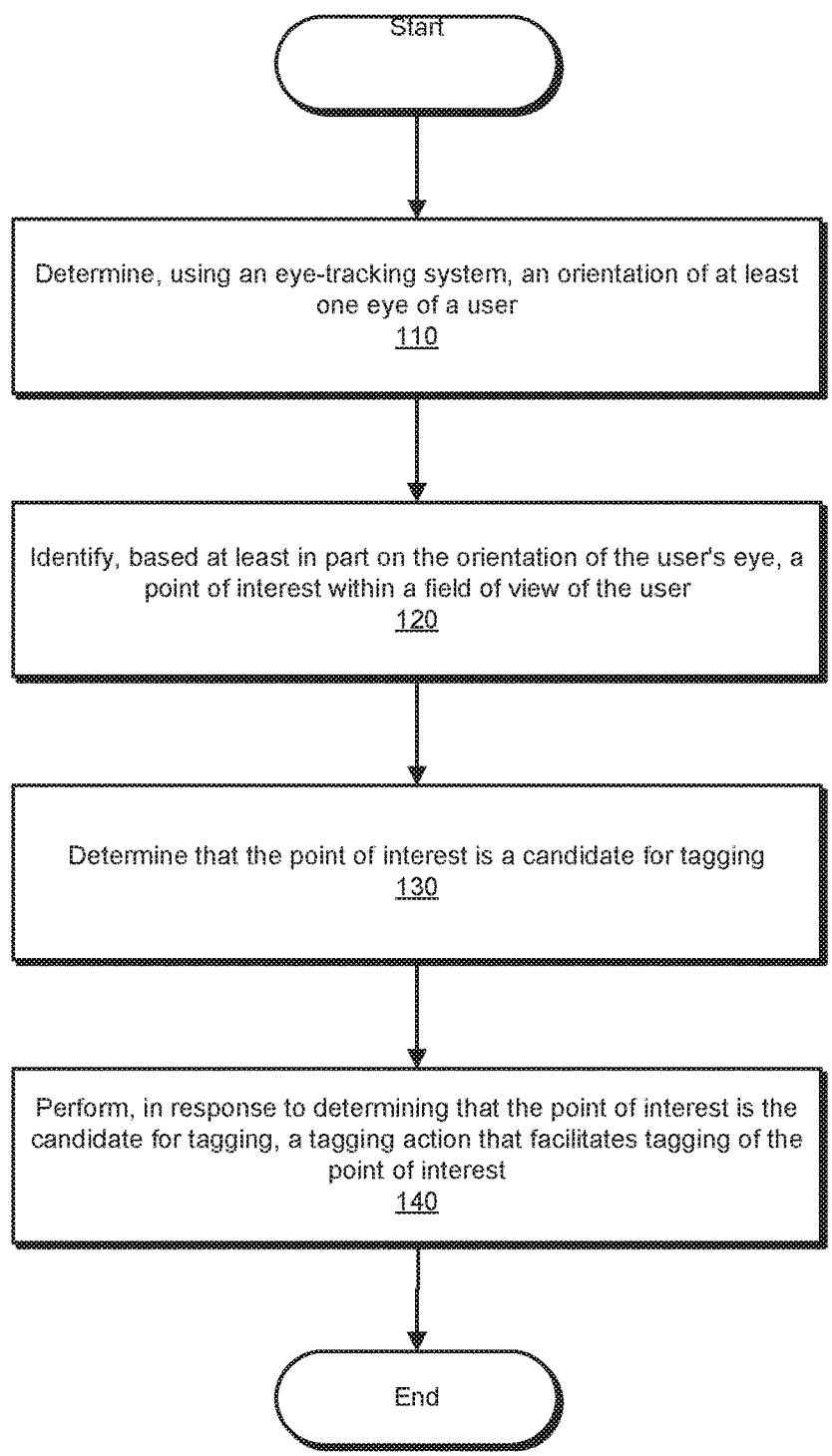
FIG. 1 is a flow diagram of an example method for virtually tagging objects viewed by friends and influencers.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the instant disclosure covers all modifications, equivalents, and alternatives falling within the scope of the appended claims.

DETAILED DESCRIPTION OF EXAMPLE EMBODIMENTS

The present disclosure is generally directed to systems and methods for virtually tagging objects viewed by friends and influencers. As will be explained in greater detail below, embodiments of the instant disclosure may improve upon related systems at the intersection of social networking technology and immersive technology such as virtual reality and augmented reality systems. For example, the disclosed subject matter may infer, based on information gathered from an eye-tracking system (e.g., eye gaze, dwell time, etc.), a level of interest in whatever a user is actually looking at. The disclosed subject matter may further leverage the inventive insight that this level of interest may suggest that the object upon which the user is gazing is a candidate for virtual tagging. Similarly, after successfully tagging one or more objects of interest in accordance with the method outlined above, a social networking environment interconnected with one or more users benefiting from such augmented reality headsets may reproduce the tag to further assist these users in identifying, and understanding, the tagged point of interest within a real-world environment, as further discussed below.

FIG. 1 is a flow diagram of an example computer-implemented method 100 for virtually tagging objects viewed by friends and influencers. The steps shown in FIG. 1 may be performed by any suitable computer-executable code and/or computing system, including the system(s) illustrated in FIGS. 2, 3, 8, 9, and 10. In one example, each of the steps shown in FIG. 1 may represent an algorithm whose structure includes and/or is represented by multiple sub-steps, examples of which will be provided in greater detail below.

As illustrated in FIG. 1, at step 110 one or more of the systems described herein may determine, using an eye-tracking system, an orientation of at least one eye of a user. For example, at step 110, determination module 104 may, as part of computing device 302 (i.e., within system 300 shown in FIG. 3), determine, in coordination with an eye-tracking system, the orientation of at least one eye of a user. Moreover, as further shown in FIG. 2, determination module 104 may record information indicating one or more details regarding the orientation of the eye of the user as orientation data 222 within a database 220.

Figure 2:
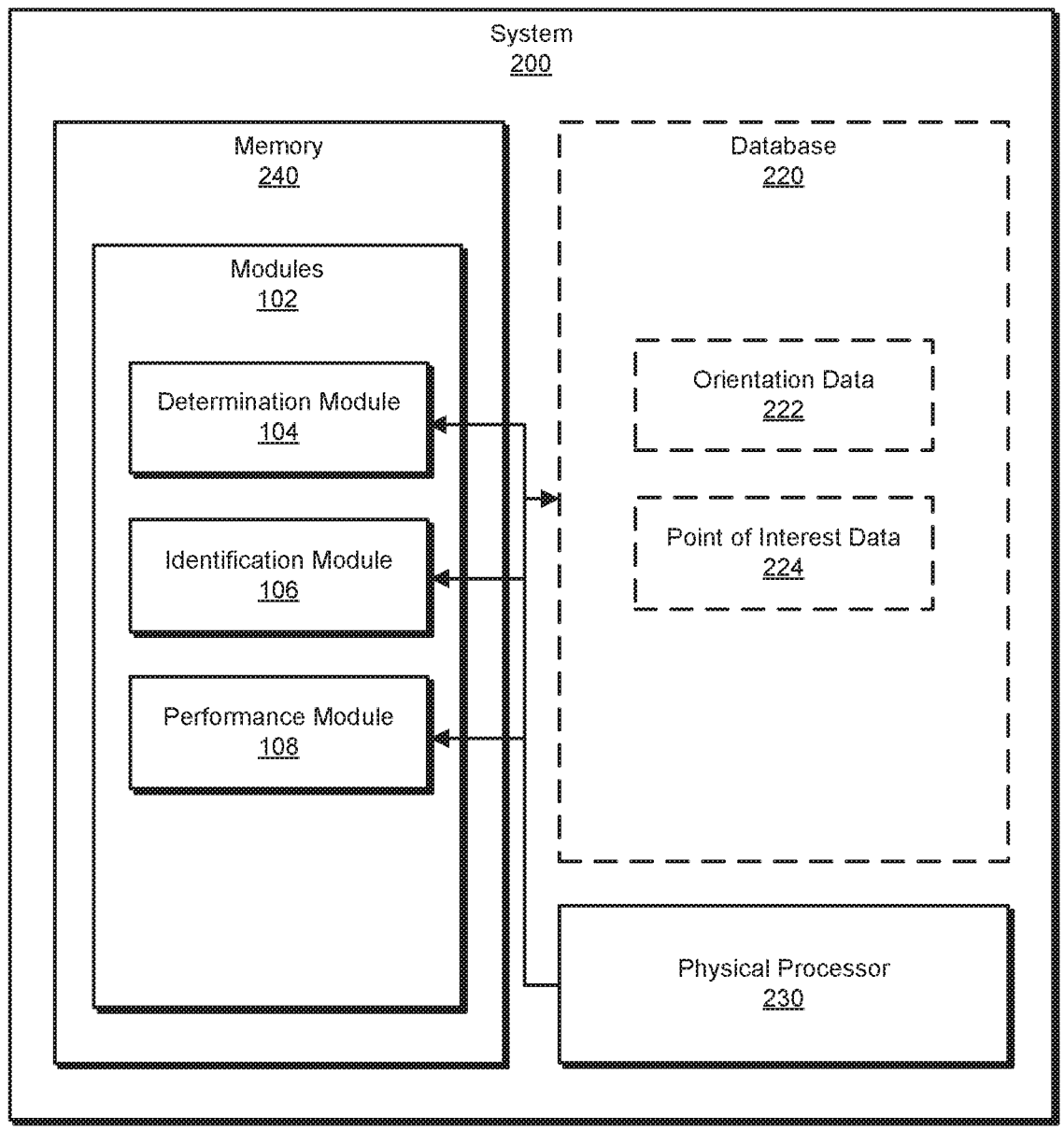
FIG. 2 is a block diagram of an example system corresponding to the method for virtually tagging objects viewed by friends and influencers.
Figure 3:
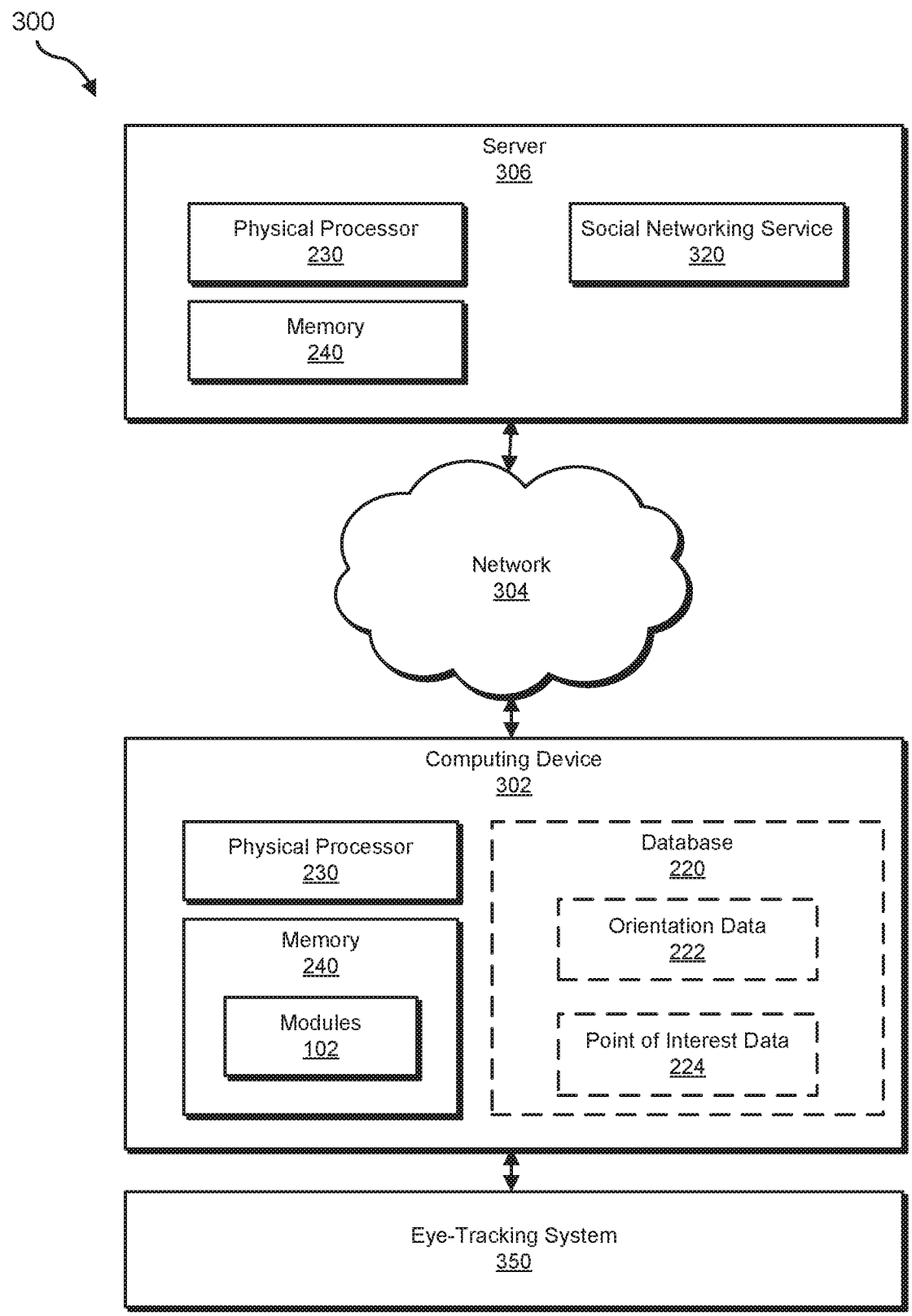
FIG. 3 is a block diagram of another example system corresponding to the method for virtually tagging objects viewed by friends and influencers.

In addition to method 100 shown in FIG. 1 and system 200 shown in FIG. 2, FIG. 3 shows another example system, which further situates modules 102 within a larger networking context. This larger networking context may include a server 306, which may communicate with computing device 302 over a network 304. In some examples, network 304 may correspond to a wide area network, such as the Internet. As further shown in the example of FIG. 3, server 306 may correspond to a backend server of a social networking platform. Accordingly, server 306 may also provide a social networking service 320. Social networking service 320 may interact with one or more immersive technology components, such as an augmented reality band or goggle and/or virtual reality headset, which may correspond to computing device 302. FIGS. 2 and 3 also illustrate how system 200 and system 300 are directed to real-world tangible and technological improvements to computing technology, and thereby further include physical computing and memory components, such as a physical processor 230 and physical memory 240, which are discussed in more detail in the remarks below after the discussion of method 100 concludes.

Determination module 104 may determine the orientation of the eye of the user in a variety of ways. In general, determination module 104 may request orientation data 222 from an eye-tracking system, such as an eye-tracking system 350 shown in FIG. 3. Eye-tracking system 350 may have previously recorded orientation data 222 based on a corresponding camera or sensor monitoring the eye of the user. In some examples determination module 104 may receive orientation data 222 from eye-tracking system 350 without determination module 104 previously requesting this item of information from eye-tracking system 350.

Eye-tracking system 350 may correspond to any suitable or applicable eye-tracking component, device, and/or monitoring system, which may operate in conjunction with an immersive technology item, such as a virtual reality headset and/or augmented reality band or goggle set. In general, eye-tracking system 350 may visually monitor, or otherwise monitor, at least one or both of the eyes of the user. For example, eye-tracking system 350 may be disposed within computing device 302 such that one or more cameras, or other sensors, are oriented toward one or both of the eyes of the user. Accordingly, the sensors may provide input into one or more circuits or computing components within eye-tracking system 350. In some examples the sensors may provide a continuous stream of input, such as video input, into the circuits or computing components. Upon receiving the sensor data, these circuits or computing components may effectively analyze the incoming sensory data to process it and accordingly extract one or more items of data relating to an orientation of at least one eye of the user. For example, the circuits or computing components of eye-tracking system 350 may perform one or more analyses that model the actual eye of the user onto a three-dimensional or virtualized model.

In view of the above, the circuits or computing components may attempt to identify sub-features of the overall exposed eyeball surface of the user. Similarly, the circuits or computing components of eye-tracking system 350 may further identify, for any one or more of the sub-features identified above, a two-dimensional or three-dimensional orientation of these features within the corresponding model. For example, in some cases the circuits or computing components may effectively identify a center or central portion of the pupil of the user and also further identify, estimate, or otherwise calculate a three-dimensional center of the user's eyeball. The circuits or components may then infer onto the corresponding model a two-dimensional line or vector thereby indicating an orientation of the user's eye.

Moreover, the circuits or components may also further analyze any suitable permutation of the sub-features identified above to further estimate the corresponding curve of the lens of the user's eyeball, which may further indicate a focal distance and/or a corresponding distance between the user's eyeball and an object on which the user is focusing his or her vision (i.e., "object-distance"). Similarly, the circuits or components may further analyze the orientation of both eyeballs to thereby calculate or estimate an intersection point between two lines of sight indicated by the eyeballs, respectively, thereby further indicating the focal distance and/or object-distance. Using any one or more of the techniques identified above, eye-tracking system 350 may effectively identify a one-dimensional or two-dimensional vector corresponding to an orientation of one or more eyeballs of the user. Similarly, eye-tracking system 350 may also effectively identify an estimated focal distance and/or object-distance (e.g., a distance from the user's eyeball along the vector toward the object).

Additionally, determination module 104 and/or eye-tracking system 350 may determine, not just a relative orientation of the user's eye with respect to a center of the user's eye, but also an absolute orientation of the user's eye after situating the user's eye within a larger three-dimensional model of the larger environment around the user (e.g., the virtualized, semi-virtualized, and/or real-world environment surrounding the user). Accordingly, determination module 104 and/or eye-tracking system 350 may determine a vector and/or corresponding length from one or both eyeballs, as well as potentially identifying the intersection, within the larger three-dimensional model of the larger environment around the user. For example, eye-tracking system 350 may determine the relative orientation and/or object-distance based on locally tracking or monitoring the user's eyes, whereas computing device 302, such as an augmented reality and/or virtual reality system, may further translate one or more of these items of information into an absolute and/or three-dimensional vector and/or distance within the corresponding three-dimensional model of the environment around the user. Determination module 104 and/or eye-tracking system 350 may perform these additional steps regardless of whether the user is immersed within a completely virtual world using a virtual reality headset or a semi-virtualized world using an augmented reality system.

In addition to identifying one or more points of interest at step 110, eye-tracking system 350 and/or determination module 104 may further identify one or more objects corresponding to this point of interest. For example, eye-tracking system 350 may interface with an artificial intelligence-based object detection system. In these examples, the object detection system may optionally disaggregate visual information associated with the user's field of view to detect separately identifiable objects within the user's field of view. Moreover, eye-tracking system 350 and/or the corresponding object detection system may also subsequently map the point of interest to at least a portion of one of the separately identifiable objects detected by the object detection system.

Returning to method 100 shown in FIG. 1, at step 120, one or more of the systems described herein may identify, based at least in part on the orientation of the user's eye, a point of interest within a field of view of the user. For example, at step 120, identification module 106 may identify, based at least in part on the orientation of the user's eye, a point of interest within a field of view of the user. In some examples, identification module 106 may effectively record information indicating the orientation of the user's eye within orientation data 224 stored in database 220, as further shown in FIG. 2.

Identification module 106 may identify the point of interest within the field of view of the user in a variety of ways. In some examples, the term "point of interest" may refer to a set of at least one or more points in either (i) a specific two-dimensional plane or other surface (e.g., a specific point on a painting on which the user is gazing) and/or (ii) a three-dimensional space in which the user is present or three-dimensional subspace on which the user is gazing. In the latter scenario, the set of points of interest may include a specific surface on which the user is gazing, such as a partial or total surface on a three-dimensional statue in a museum.

In general, identification module 106 may identify the point of interest at least in part by mapping the point of interest along the orientation of the user's eye, which was determined in step 110 as further discussed above, at the point where the user's eye has focused and/or at the point where the user's two respective lines of sight, corresponding to both of the user's eyes, thereby intersect. In some embodiments, identification module 106 may identify the point of interest at least in part by receiving information indicating the point of interest from determination module 104 and/or eye-tracking system 350, as further discussed above in accordance with step 110 of method 100. In some examples, identification module 106 may request one or more of these corresponding items of information from determination module 104 and/or eye-tracking system 350. Alternatively, in some examples identification module 106 may receive these items of information without first requesting them. For example, in some scenarios identification module 106 may receive one or more continuous streams of information indicating a point of interest on which the user is gazing. More specifically, in some examples determination module 104 and/or eye-tracking system 350 may continuously monitor the movement and/or other attributes of one or more of the user's eyes, and thereby provide a continuous stream of information indicating a series of points of interest on which the user gazes, as the user continues to move his or her eyes in real-time.

Returning to method 100 of FIG. 1, at step 130, one or more of the systems described herein may determine that the point of interest is a candidate for tagging. For example, at step 130, determination module 104 may, as part of computing device 302, determine that the point of interest, as indicated by point of interest data 224 recorded within database 220, is a candidate for tagging. The term "candidate for tagging" may generally refer to one or more points of interest, in accordance with steps 110 and 120, and/or a corresponding object within the user's field of vision, which should be, for one or more reasons, the target of performing a virtual tagging action at step 140, as further discussed below. The following discussion of step 130 provides illustrative examples of these reasons for performing the tagging action on the candidate for tagging.

In some examples, determination module 104 may determine that the point of interest constitutes a candidate for tagging based merely or solely on a conclusion that the user is currently or previously gazing or focusing on this specific point of interest, as discussed further above regarding step 120. In other words, in these scenarios, the mere fact that the user has gazed or focused upon a specific point in two-dimensional or three-dimensional space thereby provides a reason to conclude that the user has at least some level of interest in this specific point and, moreover, the fact that the user has some level of interest in this specific point further indicates that this specific point may be a candidate for tagging.

Nevertheless, in some scenarios, the user may gaze or focus upon a point of interest without necessarily being interested in it. For example, the user may gaze or focus upon the point of interest for only a very brief period of time or as a transient transition point when moving his or her eyes between two other significant points of interest. In other words, human users often focus their eyes on different objects within their fields of vision without necessarily having a significant degree of interest in these different objects.

In view of the above, determination module 104 may further determine that the point of interest constitutes the candidate for tagging based on both (i) the fact that the user has gazed upon, or focused on, the point of interest for at least some period of time (known as "dwell time") and also (ii) one or more additional contextual factors that further indicate that the user is genuinely or significantly interested in this specific point, rather than being distracted or otherwise not significantly interested in this point. These additional factors may include the fact that the user has gazed upon a specific point for a certain period of time. For example, determination module 104 may compare a measurement of the amount of time a user has spent gazing upon, or focused upon, a point within the field of view with a threshold amount of time. The threshold may be defined statically and/or dynamically, etc. Accordingly, by performing this comparison, determination module 104 may thereby conclude that the user has gazed upon a specific point for a sufficient amount of time to thereby further indicate that the point is significantly interesting to the user and, therefore, may constitute a candidate for tagging. Additionally, or alternatively, the disclosed subject matter may also consider a number of times that the user has gazed upon such a specific point (e.g., returned multiple times to the same point).

Another contextual factor may include the fact that one or more other users (i.e., other than the user that has focused upon the specific point at steps 110 and 120, as further discussed above) have also gazed upon the specific point or gazed upon the specific point for a sufficiently lengthy period of time, as indicated by a comparison with a threshold or other predetermined metric. In further examples, determination module 104 may also compare a number of users who have previously gazed upon, indicated an interest in, and/or attempted to tag, the specific point or corresponding object on which the user is currently gazing. Accordingly, a larger number of users in these scenarios increases the odds that this specific point or corresponding object should constitute a candidate for tagging in accordance with step 130. Moreover, in these examples, determination module 104 may further perform the above analysis or comparison operation regarding the number of users that are currently (and/or were previously) gazing upon the specific point or object at least in part by generating a heat map that indicates an intensity of how multiple users oriented their gazes within a vicinity corresponding to the field of view of the user.

Additionally, or alternatively, another contextual factor may include the fact that the user provided input, whether in the form of manual input or vocal input, etc., during a time period around when the user was gazing upon the specific point. In the simplest example, input from the user may explicitly indicate that the point or corresponding object constitutes the candidate for tagging. For example, input from the user may designate a request to tag the object.

In further specific examples, determination module 104 may analyze one or more instances of input that the user provided during this window of time. For example, depending on the sophistication of applicable artificial intelligence and corresponding algorithms, determination module 104 may (i) previously identify one or more objects corresponding to the point upon which the user is currently gazing, (ii) analyze manual or vocal input that the user has input around the time of gazing upon this object, and (iii) further conclude that the user has provided input that relates to, or otherwise describes, in part or entirely, the previously identified object. Based upon these conclusions, determination module 104 may further conclude that the specific point constitutes a candidate for tagging in accordance with step 130.

More generally, determination module 104 may, at step 130, use any suitable additional or alternative contextual factor in the analysis to conclude that the specific point corresponds to a candidate for tagging. Such additional or alternative contextual factors may further include (i) a previous indication or designation of the corresponding object as interesting or noteworthy, as indicated by a social networking platform (e.g., tags by other users, attempts to tag the object by other users, mentions by other users, profile pages or other business or landing pages corresponding to the object), (ii) a semantic analysis of a body of documents (e.g., a number of hits on a search engine), (iii) one or more entries within lists or compendiums of noteworthy entities and objects, such as online encyclopedias, and/or (iv) a level of loudness, motion, vibrancy, or otherwise distraction-inducing features associated with the object.

Returning to method 100 of FIG. 1, at step 140, one or more of the systems described herein may perform, in response to determining that the point of interest is the candidate for tagging, a tagging action that facilitates virtually tagging the point of interest. For example, performance module 108 may, as part of computing device 302, perform step 140 at least in part by performing, in response to determination module 104 performing step 130, a tagging action that facilitates tagging of the point of interest.

In some examples, the term "tagging action" may refer to any action that a user or other entity may take, to thereby originally "tag" a point or corresponding object, or otherwise to interact with such a tag. Additionally, in some examples, the term "tag" may refer to a standardized string or symbol that a user or other entity may establish to label a point or object within a larger social networking environment, including a virtualized or semi-virtualized environment with which a social networking platform is interacting in accordance with method 100. Standard tags may include brief textual descriptions, names, emojis or other corresponding icons, an audio, video, and/or multimedia tag, character symbol specific textual encoding (e.g., hashtag labeling or "@" labeling analogous to that performed on social networking platforms), etc., as further discussed in detail below. Moreover, as further illustrated in FIGS. 4-7 one or more of these tags may be displayed adjacent or touching the specific point or corresponding object in the form of a two-dimensional or three-dimensional pop-up window or other graphical designation within a three-dimensional field of view of the user in a virtual or augmented reality device.

Figure 4:
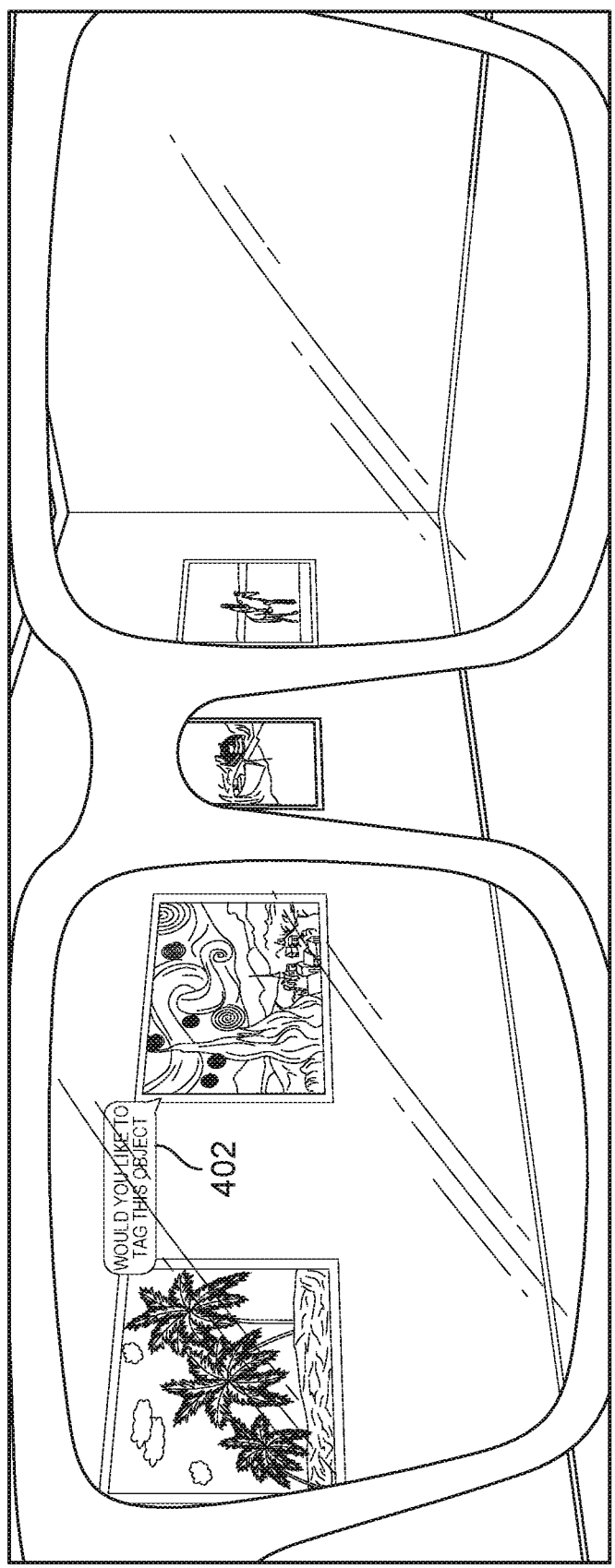
FIG. 4 is an example illustration of a viewpoint through an augmented reality system. This illustration helps demonstrate one example embodiment of the method for virtually tagging objects.
Figure 5:
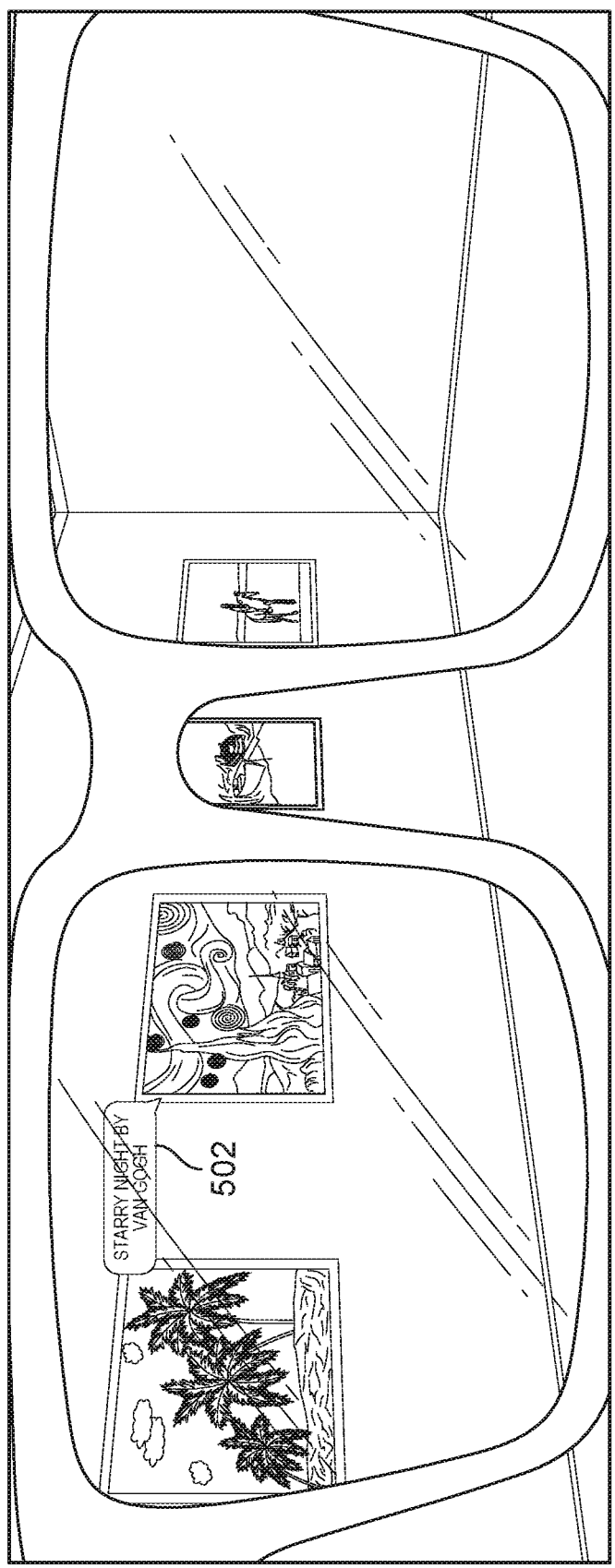
FIG. 5 is another example illustration of a viewpoint through an augmented reality system. This illustration also further helps demonstrate another example embodiment of the method for virtually tagging objects.

Performance module 108 may perform step 140 of method 100 in a variety of ways. Returning to the discussion of the term "tagging action" above, performance module 108 may perform the tagging action in part by proposing a candidate tag for tagging the point of interest. FIG. 4 shows an illustration of an internal view from behind one example of computing device 302 in the form of augmented reality goggles. The example of augmented reality goggles in FIGS. 4-7 may optionally correspond to the illustrative instance of augmented reality goggles further shown in FIG. 9 and further discussed after the conclusion of the discussion of method 100 below. As further shown in FIG. 4, from behind the augmented reality goggles corresponding to computing device 302, the user may see a semi-transparent or semi-virtualized view of the real-world field of view in front of the user's eyes. In this illustrative example, the user may be located within a museum and corresponding art gallery. Accordingly, the user may be browsing around the various hallways and rooms of the art gallery and furthermore may be gazing upon one or more different paintings or items of artwork from time to time.

In the specific illustrative example of FIG. 4, the user has temporarily stopped to gaze upon one specific painting, which may correspond to "STARRY NIGHT" by VAN GOGH. Determination module 104 may have previously determined that an orientation of one or more eyes of the user has indicated an orientation projecting a vector toward the instance of "STARRY NIGHT" hanging on the wall of the art gallery. Determination module 104 may have identified this orientation of the user's eyes in part by coordinating with eye-tracking system 350 of system 300, as further discussed above. Moreover, as further discussed above regarding step 130 of method 100, determination module 104 may also have concluded that the object corresponding to this painting hanging on the art gallery walls constitutes a candidate for tagging. For example, other users may have previously gazed upon this painting, other users may have previously indicated an interest in this painting, other users may have previously tagged this painting within a social networking platform or online platform, etc.

In some sophisticated embodiments, determination module 104 may also scan the image corresponding to this painting hanging on the walls of the art gallery and, based on the scanning, further perform a reverse image search of the painting within one or more databases, such as an online Internet search engine (e.g., a reverse image search). In even further sophisticated examples, determination module 104 may obtain, from the results of this reverse image search, one or more webpages, documents, encyclopedia entries, or other content entries that further describe the object identified through the reverse image search. In the specific example of FIG. 4, determination module 104 may further correlate the results of the reverse image search, which may produce numerous instances of the textual string "STARRY NIGHT" with an online encyclopedia entry for "STARRY NIGHT." Moreover, due to the fact that online encyclopedias typically have a "noteworthiness" condition, determination module 104 may thereby further conclude that this specific painting hanging on the walls of the art gallery is sufficiently noteworthy and, for that reason, constitutes a candidate for tagging for which performance module 108 should perform the tagging action.

In view of the above, at step 140 performance module 108 may further perform the tagging action in the form of proposing a specific tag to the user or requesting that the user specify a specific tag. As illustrated in the example of FIG. 4, performance module 108 may specifically propose that the user tag this specific painting by issuing a notification, such as a visual pop-up message 402, with the text "WOULD YOU LIKE TO TAG THIS OBJECT" Additionally, or alternatively, performance module 108 may issue the notification to propose tagging the object through an auditory or other output notification, as distinct from directly leveraging the semi-transparent display of the augmented reality goggles corresponding to computing device 302. Of course, as further discussed above, in other examples, performance module 108 may simply perform the tagging action in response to the user specifically requesting to tag the point or corresponding object. Referring back to FIG. 4, the user may have simply gazed upon this specific painting and subsequently clicked a button on computing device 302, or another wearable or mobile device locally connected to computing device 302. Additionally, or alternatively, the user may have simply issued a vocal request, such as "tag this object." In other examples, the user may have selected or identified the corresponding point by pointing at a corresponding location, and the pointing may be detected by a smart-glove or other comparable tracking device.

Moreover, in any of the above embodiments, identification module 106 may, at any one or more of the steps of method 100, assist the user in selecting a specific object to be tagged at least in part by providing a visual indication of which specific point or corresponding object has been detected as the target of the user's visual focus or gaze. In the example of FIG. 4, identification module 106 may assist the user by providing a yellow highlight around, near, or surrounding the painting hanging on the wall, to thereby confirm to the user that eye-tracking system 350 has successfully detected that the user is focusing on, and/or gazing upon, the painting. Upon receiving this confirmation, the user may thereby feel a heightened sense of confidence that the tagging action is being performed on the correct point or object within the user's field of view.

Furthermore, as mentioned above in some examples performance module 108 may propose the tag for the point or corresponding object to help assist the user in conveniently performing the tagging action. As discussed above regarding step 130, determination module 104 may have previously used any one of multiple different algorithms or heuristics to successfully conclude that the painting hanging on the wall, and the focus of the user's gaze, constitutes the notable painting "STARRY NIGHT." Moreover, determination module 104 may also have the sophistication or intelligence to further identify the famous painter of this specific painting, VAN GOGH. Accordingly, in the specific example of FIGS. 4 and 5, performance module 108 at step 140 may automatically or conveniently propose that the user correctly tag the painting hanging on the wall with the tag "STARRY NIGHT BY VAN GOGH." This proposed tag is further shown as tag 502 in FIG. 5. Moreover, after the user confirms or approves this proposed tag by performance module 108, the same tag 502 may appear within the user's field of vision using the semi-virtualized display of computing device 302. Of course, the action of actually tagging the point or object within the user's field of view will also constitute an additional or alternative "tagging action" as that term is used within this application.

In other examples, the user may provide input, such as manual input or vocal input, to specify the original tag for the painting without further proposals or assistance by performance module 108. For example, in some scenarios the tagging action performed by performance module 108 may include prompting the user to indicate a specific tag for the point of interest. In these scenarios, the user may provide the input to indicate the specific content of the tag, as further discussed above.

Performance module 108 may also perform the tagging action by tagging the object with a variety of different tags. For example, performance module 108 may tag the object with a temporary tag, a permanent tag, a public/private tag (e.g., public/private tag within the corresponding social networking environment), a visual tag (e.g., a visual tag analogous to tag 502 shown in FIG. 5), an audio tag and/or video tag, etc. Moreover, in additional or alternative examples, performance module 108 may tag the point of interest anonymously without revealing an identity of the user to one or more other users within the larger social networking environment (e.g., one or more other users to which the tag will be accessible).

The above discussion of method 100 of FIG. 1 corresponds to the original action of first generating tagging content within the larger social networking environment. Nevertheless, the entire purpose of performing these tagging actions is so that the generated tags may subsequently be consumed by one or more users within the social environment. The same user himself or herself may subsequently gaze upon the same point of interest or corresponding object that the user previously gazed upon in accordance with method 100. In these examples, performance module 108 and/or another suitable module within social networking service 320, may reproduce or display the tag. Performance module 108 may display the same tag in a manner parallel to how performance module 108 first displayed the tag as a confirmation to the user completing or finalizing the original tagging action discussed above in connection with FIG. 5. With reference to the illustrative example of FIG. 5, after originally tagging the painting hanging on the walls of the art gallery at step 140, the user may then have averted his or her gaze, walked to face another painting, gazed upon the subsequent painting, and then returned to gaze upon the original "STARRY NIGHT" painting referenced above regarding FIG. 5. Accordingly, performance module 108 may then reproduce the visual display of tag 502 as further shown in FIG. 5.

Of course, in addition to the same user returning to gaze upon the painting hanging on the walls of the art gallery after the tagging action performed at step 140, a different user within the same larger social networking environment may also gaze upon the painting. Accordingly, in this example this new and different user may optionally benefit from the performance of method 100 by the previous user such that the new and different user consumes (e.g., views) the tag previously finalized by the previous user. In other words, when this new and different user comes to gaze upon the same painting hanging on the walls of the art gallery, the new user may come to see the visual display of tag 502 in a manner parallel to how the original user saw the finalized confirmation of tag 502 within FIG. 5, as further discussed above.

Figure 6:
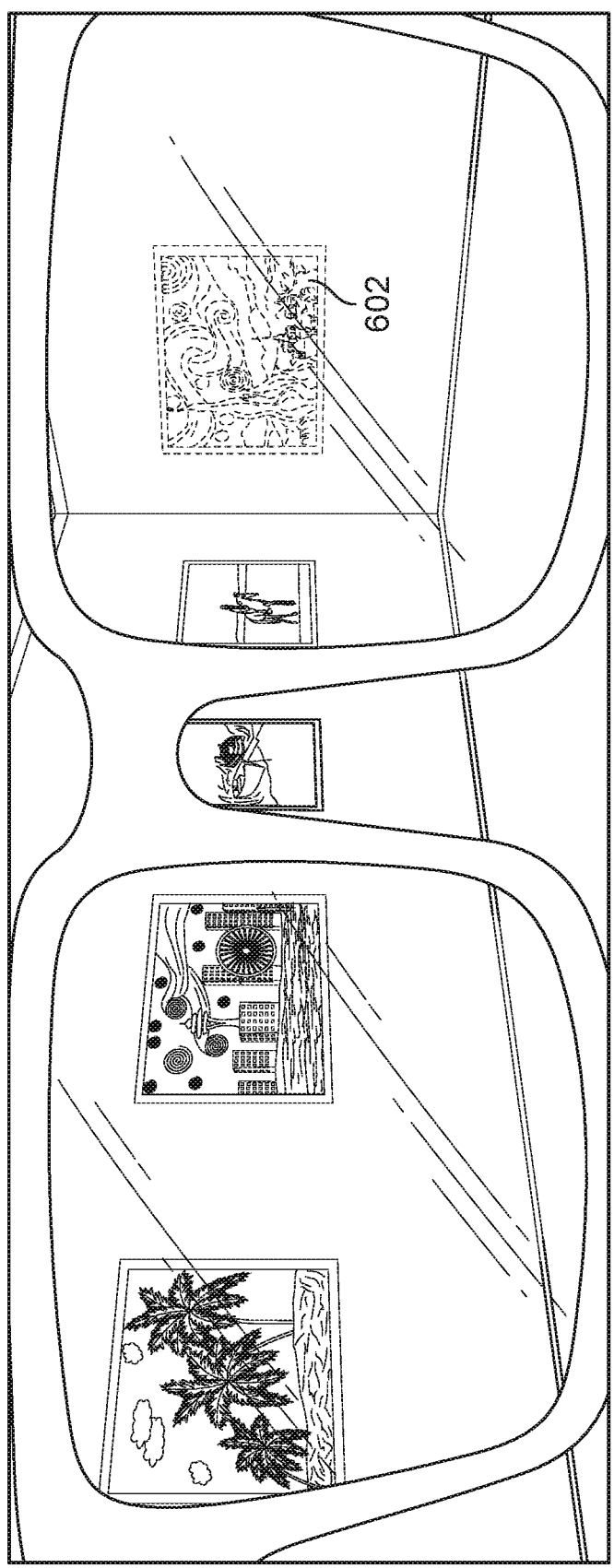
FIG. 6 is another example illustration of a viewpoint through an augmented reality system. This illustration additionally further helps demonstrate another example embodiment of the method for virtually tagging objects.
Figure 7:
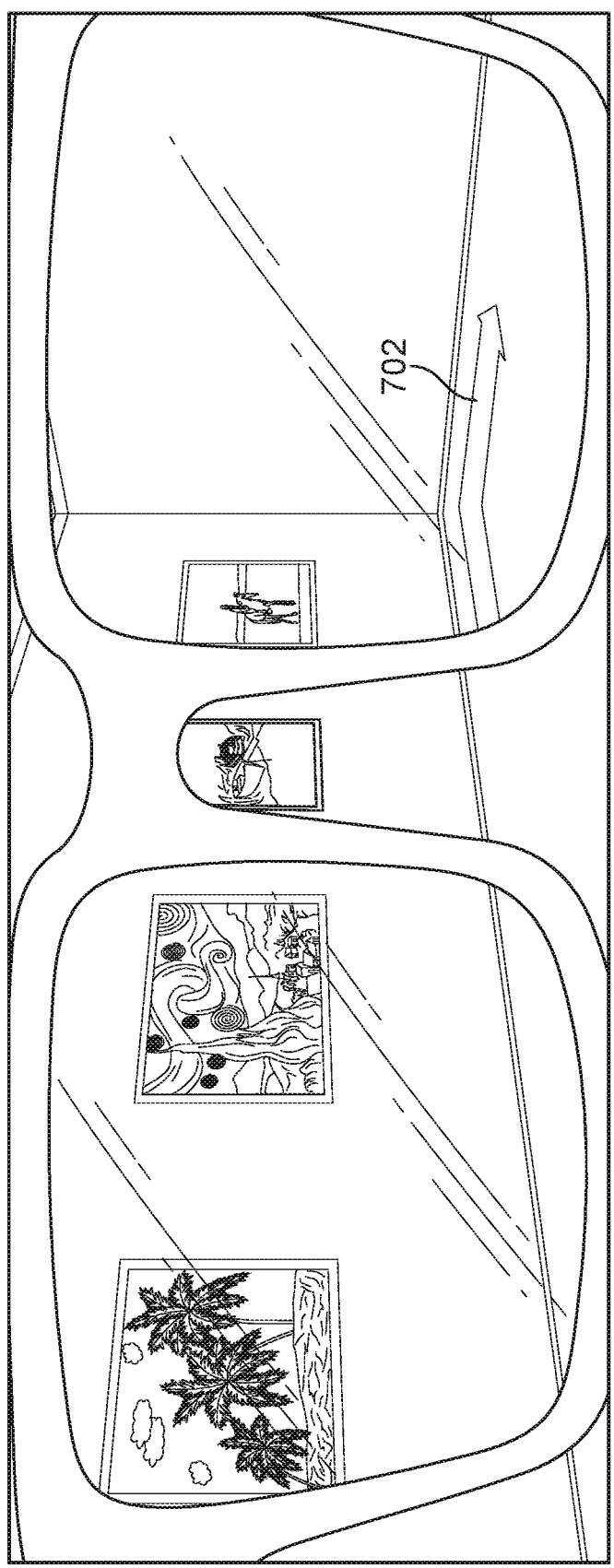
FIG. 7 is another example illustration of a viewpoint through an augmented reality system. This illustration also further helps demonstrate another example embodiment of the method for virtually tagging objects.

FIGS. 6 and 7 display two different alternative and optional features for consuming tagging content previously assigned by one or more users in accordance with system 300. FIG. 6 shows an intelligent example whereby performance module 108 may notify the same or different user of a tag on an object within an augmented reality display, even if the tag corresponds to an object that is not currently within the user's direct field of view but instead is obstructed by one or more objects or walls. In the example of FIG. 6, the same user has returned to the art gallery after the management of the art gallery has relocated or switched several of the paintings to different locations along the walls of the museum. Accordingly, in the example of FIG. 6 the user is still standing in the same location is in FIG. 6, and yet the painting of "STARRY NIGHT" is currently obstructed by a wall from the user's direct field of view. Nevertheless, in this example, performance module 108 may still provide the user with a visual indication, such as a visual "X-RAY" notification 602, thereby directing the user's attention to a notable point of interest or object even if the object is obstructed by another object, such as a wall. For example, performance module 108 may optionally draw dotted lines, or other "X-RAY" visual symbolism, to highlight to the user that a notable object is in front of the user but is nevertheless obstructed by one or more objects. Of course, this "X-RAY" functionality applies regardless of whether the painting behind the wall corresponds to the relocated instance of the same "STARRY NIGHT" painting or, instead, any other suitable object previously tagged by the same user or a different user within the larger social networking environment (e.g., a static object that has not relocated from an original location where it was tagged).

Similarly, FIG. 7 shows an illustration that elaborates on the example of FIG. 6. In this example, performance module 108 has further shown in highlight an arrow indicator 702 to further assist the user navigating to one or more notable objects within the vicinity of the user, including especially objects previously tagged by the same user or other users within the social networking environment. For example, in FIG. 7 arrow indicator 702 may intelligently redirect the user to turn around to thereby turn a corner around the wall that was obstructing one or more paintings or other notable objects, as further discussed above in connection with FIG. 6. Performance module 108 may use any suitable navigation heuristic, analogous to automobile GPS navigation heuristics, to effectively reroute or redirect the user toward any number of notable or tagged objects, including especially objects that the same user or different users previously tagged, as further discussed above in connection with method 100 of FIG. 1.

The instant disclosure describes systems and methods for virtually tagging objects viewed by friends and influencers. In one example, a computer-implemented method for performing such a task may include (i) determining, using an eye-tracking system, an orientation of at least one eye of a user, (ii) identifying, based at least in part on the orientation of the user's eye, a point of interest within a field of view of the user, (iii) determining that the point of interest is a candidate for tagging, and (iv) performing, in response to determining that the point of interest is the candidate for tagging, a tagging action that facilitates tagging of the point of interest.

In some examples, the tagging action may include at least one of (i) proposing a candidate tag for tagging the point of interest, (ii) prompting the user to indicate a specific tag for the point of interest, or (iii) tagging the point of interest with the specific tag. In further examples, tagging the point of interest with the specific tag may further include at least one of: (i) tagging the point of interest with a temporary tag, (ii) tagging the point of interest with a permanent tag, (iii) tagging the point of interest with a public tag, (iv) tagging the point of interest with a visual tag, (v) tagging the point of interest with an audio tag, (vi) tagging the point of interest with a private tag, or (vii) tagging the point of interest anonymously without revealing an identity of the user to one or more other users to which the specific tag will be accessible.

In additional examples, proposing the candidate tag for tagging the point of interest is based on detecting, through another corresponding eye-tracking system, that an additional user has looked at the point of interest. Moreover, in further embodiments, detecting that the additional user has looked at the point of interest further includes generating a heat map that indicates an intensity of how multiple users oriented their gazes within a vicinity corresponding to the field of view of the user.

Additionally, in some embodiments determining that the point of interest is the candidate for tagging includes receiving input from the user indicating that the user has selected the point of interest as the candidate for tagging. Moreover, in further examples, receiving input from the user indicating that the user has selected the point of interest as the candidate for tagging includes at least one of: (i) receiving a vocal auditory indication from the user or (ii) detecting manual selection of a button.

In even further examples, identifying the point of interest includes (i) disaggregating, via an object-detection system, visual information associated with the user's field of view to detect separately identifiable objects within the user's field of view and (ii) mapping the point of interest to at least a portion of one of the separately identifiable objects detected by the object-detection system.

Moreover, in some examples, the point of interest further includes (i) at least one point along a line corresponding to the orientation of the user's eye, (ii) a two-dimensional set of points indicating a planar surface within the field of view of the user, or (iii) a three-dimensional set of points indicating an object within the field of view of the user. Additionally, in even further examples, the method may further include (i) detecting, using a corresponding eye-tracking system, that the user or an additional user has looked at the point of interest and (ii) displaying, to the user or the additional user, a tag for the point of interest that was generated by the tagging action.

In addition, as discussed further above in connection with FIG. 2, a system corresponding to the above method may include (i) a determination module, stored in memory, that determines, using an eye-tracking system, an orientation of at least one eye of a user, (ii) an identification module, stored in memory, that identifies, based at least in part on the orientation of the user's eye, a point of interest within a field of view of the user, (iii) where the determination module further determines that the point of interest is a candidate for tagging, (iv) a performance module, stored in memory, that performs, in response to determining that the point of interest is the candidate for tagging, a tagging action that facilitates tagging of the point of interest, and (v) at least one physical processor configured to execute the determination module, the identification module, and the performance module.

In some examples, the above-described method may be encoded as computer-readable instructions on a computer-readable medium. For example, a computer-readable medium may include one or more computer-executable instructions that, when executed by at least one processor of a computing device, may cause the computing device to (i) determine, using an eye-tracking system, an orientation of at least one eye of a user, (ii) identify, based at least in part on the orientation of the user's eye, a point of interest within a field of view of the user, (iii) determine that the point of interest is a candidate for tagging, and (iv) perform, in response to determining that the point of interest is the candidate for tagging, a tagging action that facilitates tagging of the point of interest.

Embodiments of the instant disclosure may include or be implemented in conjunction with various types of artificial reality systems. Artificial reality is a form of reality that has been adjusted in some manner before presentation to a user, which may include, e.g., a virtual reality (VR), an augmented reality (AR), a mixed reality (MR), a hybrid reality, or some combination and/or derivative thereof. Artificial reality content may include completely generated content or generated content combined with captured (e.g., real-world) content. The artificial reality content may include video, audio, haptic feedback, or some combination thereof, any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., to perform activities in) an artificial reality.

Artificial reality systems may be implemented in a variety of different form factors and configurations. Some artificial reality systems may be designed to work without near-eye displays (NEDs), an example of which is AR system 800 in FIG. 8. Other artificial reality systems may include an NED that also provides visibility into the real world (e.g., AR system 200 in FIG. 2) or that visually immerses a user in an artificial reality (e.g., VR system 300 in FIG. 3). While some artificial reality devices may be self-contained systems, other artificial reality devices may communicate and/or coordinate with external devices to provide an artificial reality experience to a user. Examples of such external devices include handheld controllers, mobile devices, desktop computers, devices worn by a user, devices worn by one or more other users, and/or any other suitable external system.

Figure 8:
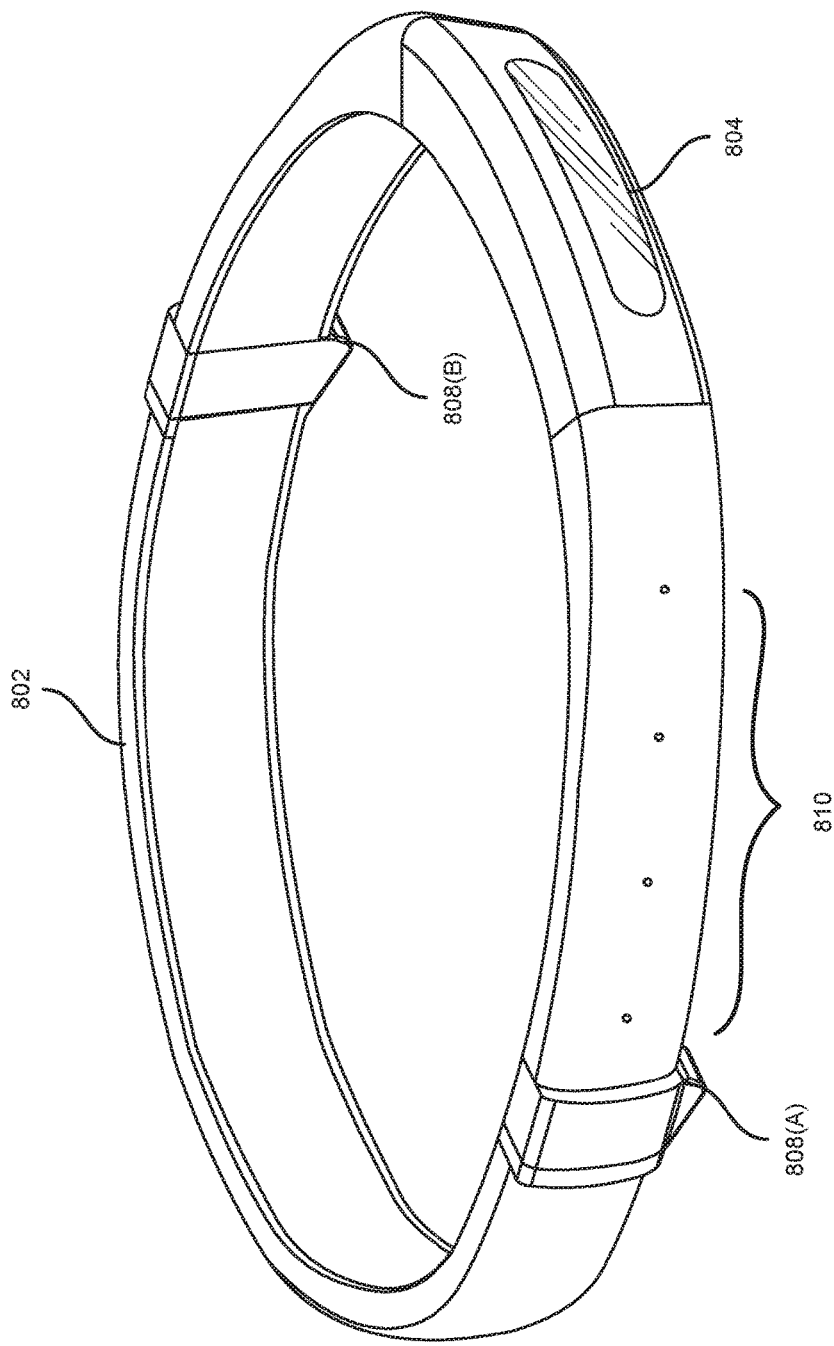
FIG. 8 is an illustration of an example augmented reality band that may be used in connection with the method for virtually tagging objects.

Turning to FIG. 8, AR system 800 generally represents a wearable device dimensioned to fit about a body part (e.g., a head) of a user. As shown in FIG. 8, system 800 may include a frame 802 and a camera assembly 804 that is coupled to frame 802 and configured to gather information about a local environment by observing the local environment. AR system 800 may also include one or more audio devices, such as output audio transducers 808(A) and 808 (B) and input audio transducers 810. Output audio transducers 808(A) and 808(B) may provide audio feedback and/or content to a user, and input audio transducers 810 may capture audio in a user's environment.

As shown, AR system 800 may not necessarily include an NED positioned in front of a user's eyes. AR systems without NEDs may take a variety of forms, such as headbands, hats, hairbands, belts, watches, wristbands, ankle bands, rings, neckbands, necklaces, chest bands, eyewear frames, and/or any other suitable type or form of apparatus. While AR system 800 may not include an NED, AR system 800 may include other types of screens or visual feedback devices (e.g., a display screen integrated into a side of frame 802).

Figure 9:
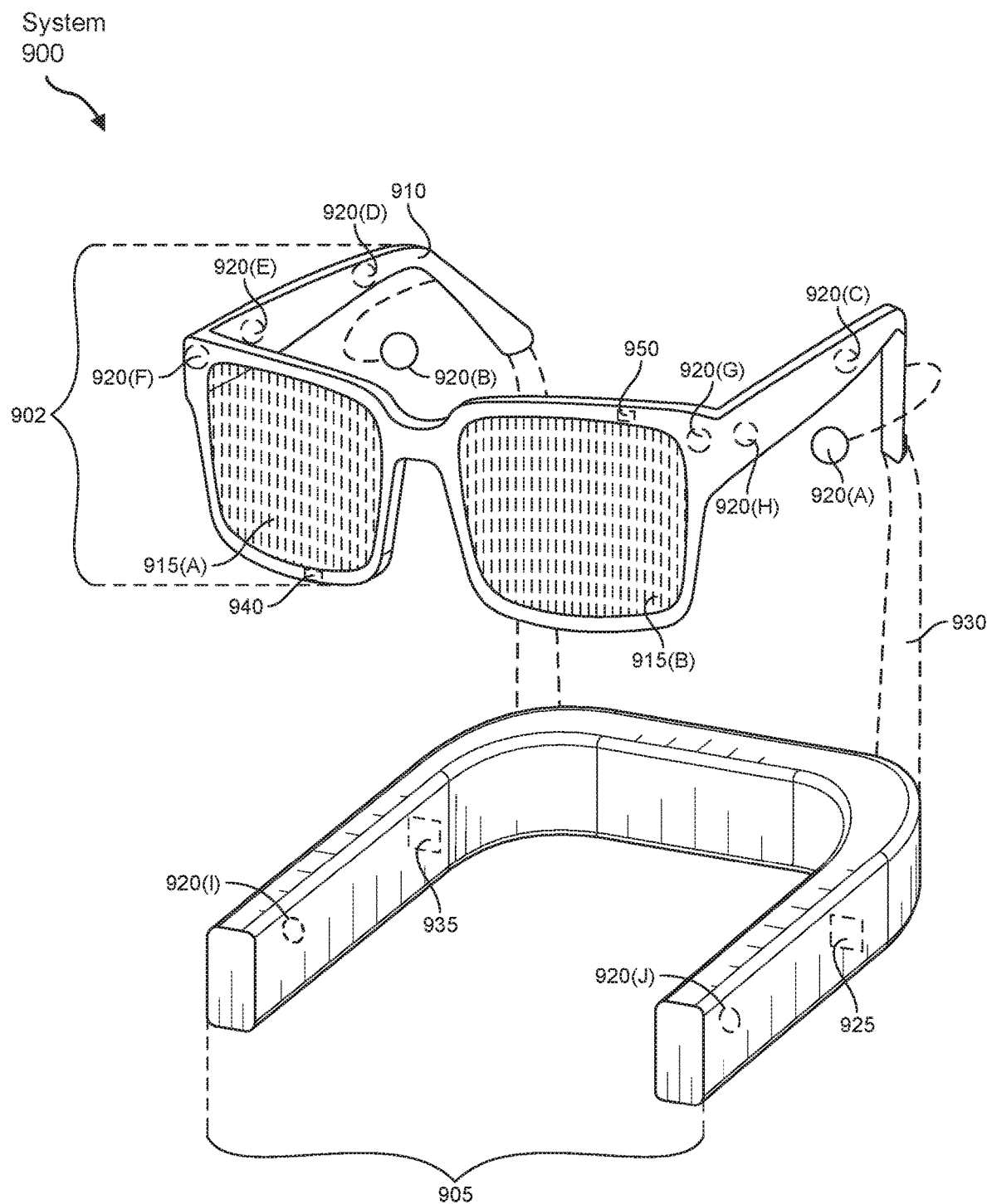
FIG. 9 is an illustration of an example augmented reality set of goggles that may be used in connection with the method for virtually tagging objects.

The embodiments discussed in this disclosure may also be implemented in AR systems that include one or more NEDs. For example, as shown in FIG. 9, AR system 900 may include an eyewear device 902 with a frame 910 configured to hold a left display device 915(A) and a right display device 915(B) in front of a user's eyes. Display devices 915(A) and 915(B) may act together or independently to present an image or series of images to a user. While AR system 900 includes two displays, embodiments of this disclosure may be implemented in AR systems with a single NED or more than two NEDs.

In some embodiments, AR system 900 may include one or more sensors, such as sensor 940. Sensor 940 may generate measurement signals in response to motion of AR system 900 and may be located on substantially any portion of frame 910. Sensor 940 may include a position sensor, an inertial measurement unit (IMU), a depth camera assembly, or any combination thereof. In some embodiments, AR system 900 may or may not include sensor 940 or may include more than one sensor. In embodiments in which sensor 940 includes an IMU, the IMU may generate calibration data based on measurement signals from sensor 940. Examples of sensor 940 may include, without limitation, accelerometers, gyroscopes, magnetometers, other suitable types of sensors that detect motion, sensors used for error correction of the IMU, or some combination thereof.

AR system 900 may also include a microphone array with a plurality of acoustic sensors 920(A)-920(J), referred to collectively as acoustic sensors 920. Acoustic sensors 920 may be transducers that detect air pressure variations induced by sound waves. Each acoustic sensor 920 may be configured to detect sound and convert the detected sound into an electronic format (e.g., an analog or digital format). The microphone array in FIG. 9 may include, for example, ten acoustic sensors: 920(A) and 920(B), which may be designed to be placed inside a corresponding ear of the user, acoustic sensors 920(C), 920(D), 920(E), 920(F), 920(G), and 920(H), which may be positioned at various locations on frame 910, and/or acoustic sensors 920(I) and 920(J), which may be positioned on a corresponding neckband 905.

The configuration of acoustic sensors 920 of the microphone array may vary. While AR system 900 is shown in FIG. 9 as having ten acoustic sensors 920, the number of acoustic sensors 920 may be greater or less than ten. In some embodiments, using higher numbers of acoustic sensors 920 may increase the amount of audio information collected and/or the sensitivity and accuracy of the audio information.

In contrast, using a lower number of acoustic sensors 920 may decrease the computing power required by the controller 950 to process the collected audio information. In addition, the position of each acoustic sensor 920 of the microphone array may vary. For example, the position of an acoustic sensor 920 may include a defined position on the user, a defined coordinate on the frame 910, an orientation associated with each acoustic sensor, or some combination thereof.

Acoustic sensors 920(A) and 920(B) may be positioned on different parts of the user's ear, such as behind the pinna or within the auricle or fossa. Or, there may be additional acoustic sensors on or surrounding the ear in addition to acoustic sensors 920 inside the ear canal. Having an acoustic sensor positioned next to an ear canal of a user may enable the microphone array to collect information on how sounds arrive at the ear canal. By positioning at least two of acoustic sensors 920 on either side of a user's head (e.g., as binaural microphones), AR system 900 may simulate binaural hearing and capture a 3D stereo sound field around about a user's head. In some embodiments, acoustic sensors 920(A) and 920(B) may be connected to AR system 900 via a wired connection and, in other embodiments, the acoustic sensors 920(A) and 920(B) may be connected to AR system 900 via a wireless connection (e.g., a BLUETOOTH® connection). In still other embodiments, acoustic sensors 920(A) and 920(B) may not be used at all in conjunction with AR system 900.

Acoustic sensors 920 on frame 910 may be positioned along the length of the temples, across the bridge, above or below display devices 915(A) and 915(B), or some combination thereof. Acoustic sensors 920 may be oriented such that the microphone array is able to detect sounds in a wide range of directions surrounding the user wearing the AR system 900. In some embodiments, an optimization process may be performed during manufacturing of AR system 900 to determine relative positioning of each acoustic sensor 920 in the microphone array.

AR system 900 may further include or be connected to an external device (e.g., a paired device), such as neckband 905. As shown, neckband 905 may be coupled to eyewear device 902 via one or more connectors 930. Connectors 930 may be wired or wireless connectors and may include electrical and/or non-electrical (e.g., structural) components. In some cases, eyewear device 902 and neckband 905 may operate independently without any wired or wireless connection between them. While FIG. 9 illustrates the components of eyewear device 902 and neckband 905 in example locations on eyewear device 902 and neckband 905, the components may be located elsewhere and/or distributed differently on eyewear device 902 and/or neckband 905. In some embodiments, the components of eyewear device 902 and neckband 905 may be located on one or more additional peripheral devices paired with eyewear device 902, neckband 905, or some combination thereof. Furthermore, neckband 905 generally represents any type or form of paired device. Thus, the following discussion of neckband 905 may also apply to various other paired devices, such as smart watches, smart phones, wrist bands, other wearable devices, handheld controllers, tablet computers, laptop computers, etc.

Pairing external devices, such as neckband 905, with AR eyewear devices may enable the eyewear devices to achieve the form factor of a pair of glasses while still providing sufficient battery and computation power for expanded capabilities. Some or all of the battery power, computational resources, and/or additional features of AR system 900 may be provided by a paired device or shared between a paired device and an eyewear device, thus reducing the weight, heat profile, and form factor of the eyewear device overall while still retaining desired functionality. For example, neckband 905 may allow components that would otherwise be included on an eyewear device to be included in neckband 905 since users may tolerate a heavier weight load on their shoulders than they would tolerate on their heads. Neckband 905 may also have a larger surface area over which to diffuse and disperse heat to the ambient environment. Thus, neckband 905 may allow for greater battery and computation capacity than might otherwise have been possible on a stand-alone eyewear device. Since weight carried in neckband 905 may be less invasive to a user than weight carried in eyewear device 902, a user may tolerate wearing a lighter eyewear device and carrying or wearing the paired device for greater lengths of time than a user would tolerate wearing a heavy stand-alone eyewear device, thereby enabling an artificial reality environment to be incorporated more fully into a user's day-to-day activities.

Neckband 905 may be communicatively coupled with eyewear device 902 and/or to other devices. The other devices may provide certain functions (e.g., tracking, localizing, depth mapping, processing, storage, etc.) to AR system 900. In the embodiment of FIG. 9, neckband 905 may include two acoustic sensors (e.g., 920(1) and 920(J)) that are part of the microphone array (or potentially form their own microphone subarray). Neckband 905 may also include a controller 925 and a power source 935.

Acoustic sensors 920(1) and 920(J) of neckband 905 may be configured to detect sound and convert the detected sound into an electronic format (analog or digital). In the embodiment of FIG. 9, acoustic sensors 920(1) and 920(J) may be positioned on neckband 905, thereby increasing the distance between the neckband acoustic sensors 920(1) and 920(J) and other acoustic sensors 920 positioned on eyewear device 902. In some cases, increasing the distance between acoustic sensors 920 of the microphone array may improve the accuracy of beamforming performed via the microphone array. For example, if a sound is detected by acoustic sensors 920(C) and 920(D) and the distance between acoustic sensors 920(C) and 920(D) is greater than, e.g., the distance between acoustic sensors 920(D) and 920(E), the determined source location of the detected sound may be more accurate than if the sound had been detected by acoustic sensors 920(D) and 920(E).

Controller 925 of neckband 905 may process information generated by the sensors on neckband 905 and/or AR system 900. For example, controller 925 may process information from the microphone array that describes sounds detected by the microphone array. For each detected sound, controller 925 may perform a DoA estimation to estimate a direction from which the detected sound arrived at the microphone array. As the microphone array detects sounds, controller 925 may populate an audio data set with the information. In embodiments in which AR system 900 includes an inertial measurement unit, controller 925 may compute all inertial and spatial calculations from the IMU located on eyewear device 902. Connector 930 may convey information between AR system 900 and neckband 905 and between AR system 900 and controller 925. The information may be in the form of optical data, electrical data, wireless data, or any other transmittable data form. Moving the processing of information generated by AR system 900 to neckband 905 may reduce weight and heat in eyewear device 902, making it more comfortable to the user.

Power source 935 in neckband 905 may provide power to eyewear device 902 and/or to neckband 905. Power source 935 may include, without limitation, lithium-ion batteries, lithium-polymer batteries, primary lithium batteries, alkaline batteries, or any other form of power storage. In some cases, power source 935 may be a wired power source. Including power source 935 on neckband 905 instead of on eyewear device 902 may help better distribute the weight and heat generated by power source 935.

As noted, some artificial reality systems may, instead of blending an artificial reality with actual reality, substantially replace one or more of a user's sensory perceptions of the real world with a virtual experience. One example of this type of system is a head-worn display system, such as VR system 1000 in FIG. 10, that mostly or completely covers a user's field of view. VR system 1000 may include a front rigid body 1002 and a band 1004 shaped to fit around a user's head. VR system 1000 may also include output audio transducers 1006(A) and 1006(B). Furthermore, while not shown in FIG. 10, front rigid body 1002 may include one or more electronic elements, including one or more electronic displays, one or more inertial measurement units (IMUS), one or more tracking emitters or detectors, and/or any other suitable device or system for creating an artificial reality experience.

Artificial reality systems may include a variety of types of visual feedback mechanisms. For example, display devices in AR system 900 and/or VR system 1000 may include one or more liquid crystal displays (LCDs), light emitting diode (LED) displays, organic LED (OLED) displays, and/or any other suitable type of display screen. Artificial reality systems may include a single display screen for both eyes or may provide a display screen for each eye, which may allow for additional flexibility for varifocal adjustments or for correcting a user's refractive error. Some artificial reality systems may also include optical subsystems having one or more lenses (e.g., conventional concave or convex lenses, Fresnel lenses, adjustable liquid lenses, etc.) through which a user may view a display screen.

In addition to or instead of using display screens, some artificial reality systems may include one or more projection systems. For example, display devices in AR system 900 and/or VR system 1000 may include micro-LED projectors that project light (using, e.g., a waveguide) into display devices, such as clear combiner lenses that allow ambient light to pass through. The display devices may refract the projected light toward a user's pupil and may enable a user to simultaneously view both artificial reality content and the real world. Artificial reality systems may also be configured with any other suitable type or form of image projection system.

Artificial reality systems may also include various types of computer vision components and subsystems. For example, AR system 800, AR system 900, and/or VR system 1000 may include one or more optical sensors such as two-dimensional (2D) or three-dimensional (3D) cameras, time-of-flight depth sensors, single-beam or sweeping laser rangefinders, 3D LiDAR sensors, and/or any other suitable type or form of optical sensor. An artificial reality system may process data from one or more of these sensors to identify a location of a user, to map the real world, to provide a user with context about real-world surroundings, and/or to perform a variety of other functions.

Artificial reality systems may also include one or more input and/or output audio transducers. In the examples shown in FIGS. 8 and 10, output audio transducers 1006(A) and 1006(B) may include voice coil speakers, ribbon speakers, electrostatic speakers, piezoelectric speakers, bone conduction transducers, cartilage conduction transducers, and/or any other suitable type or form of audio transducer. Similarly, input audio transducers 810 may include condenser microphones, dynamic microphones, ribbon microphones, and/or any other type or form of input transducer. In some embodiments, a single transducer may be used for both audio input and audio output.

Figure 10:
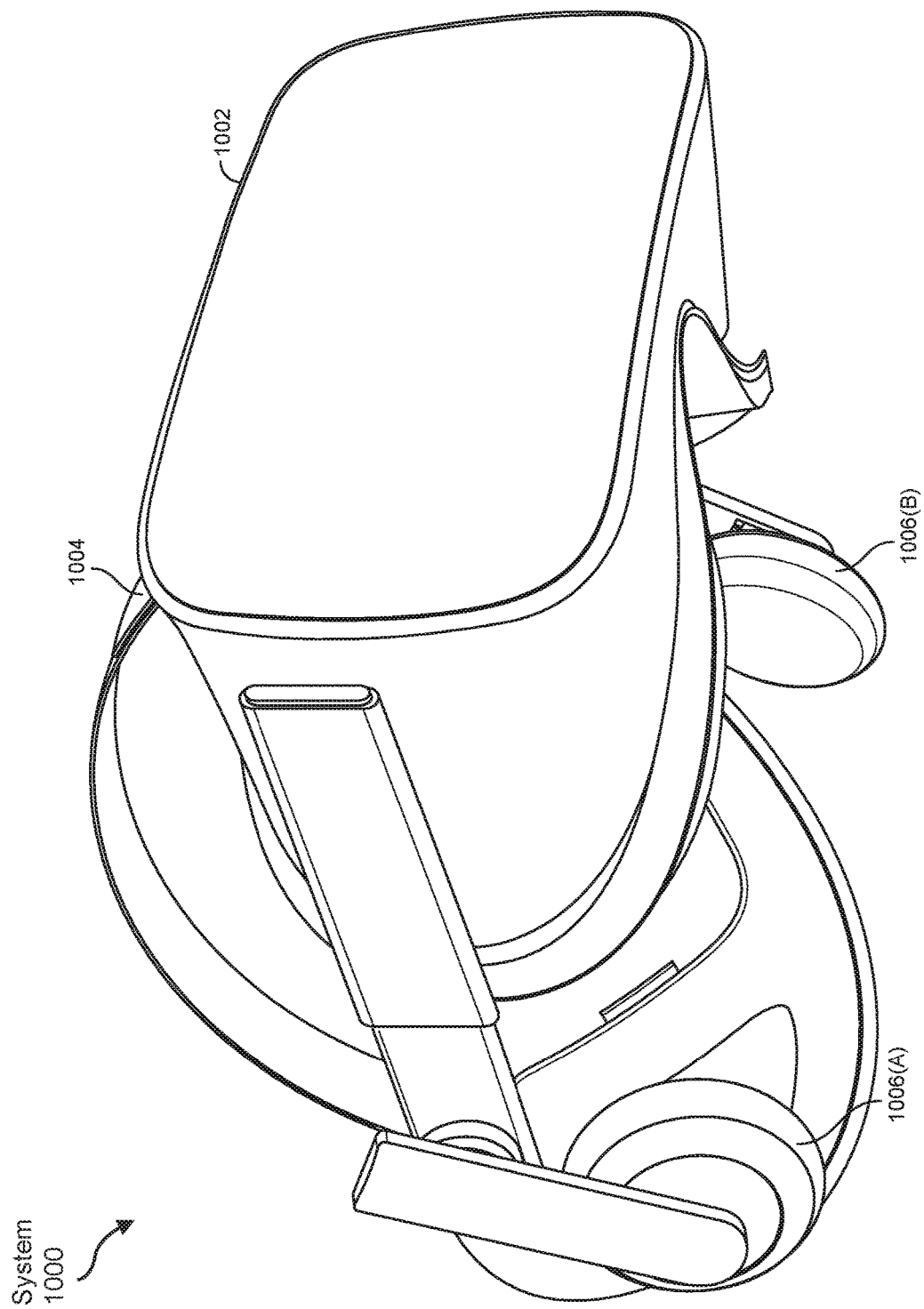
FIG. 10 is an illustration of an example virtual reality headset that may be used in connection with the method for virtually tagging objects.

While not shown in FIGS. 8-10, artificial reality systems may include tactile (i.e., haptic) feedback systems, which may be incorporated into headwear, gloves, body suits, handheld controllers, environmental devices (e.g., chairs, floormats, etc.), and/or any other type of device or system. Haptic feedback systems may provide various types of cutaneous feedback, including vibration, force, traction, texture, and/or temperature. Haptic feedback systems may also provide various types of kinesthetic feedback, such as motion and compliance. Haptic feedback may be implemented using motors, piezoelectric actuators, fluidic systems, and/or a variety of other types of feedback mechanisms. Haptic feedback systems may be implemented independent of other artificial reality devices, within other artificial reality devices, and/or in conjunction with other artificial reality devices.

By providing haptic sensations, audible content, and/or visual content, artificial reality systems may create an entire virtual experience or enhance a user's real-world experience in a variety of contexts and environments. For instance, artificial reality systems may assist or extend a user's perception, memory, or cognition within a particular environment. Some systems may enhance a user's interactions with other people in the real world or may enable more immersive interactions with other people in a virtual world. Artificial reality systems may also be used for educational purposes (e.g., for teaching or training in schools, hospitals, government organizations, military organizations, business enterprises, etc.), entertainment purposes (e.g., for playing video games, listening to music, watching video content, etc.), and/or for accessibility purposes (e.g., as hearing aids, visuals aids, etc.). The embodiments disclosed herein may enable or enhance a user's artificial reality experience in one or more of these contexts and environments and/or in other contexts and environments.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

In some embodiments, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Discs (CDs), Digital Video Discs (DVDs), and BLU-RAY® discs), electronic-storage media (e.g., solid-state drives and flash media), and other distribution systems.

Embodiments of the instant disclosure may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a stand-alone HMD, a mobile device or computing system, or any other hardware platform capable of providing artificial reality content to one or more viewers.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method, at least a portion of the method being performed by a computing device comprising at least one processor, the method comprising:
   determining, using an eye-tracking system, an orientation of at least one eye of a user;
   identifying, based at least in part on the orientation of the user's eye, a point of interest within a field of view of the user;
   determining that the point of interest is a candidate for tagging; and
   performing, in response to determining that the point of interest is the candidate for tagging, a tagging action that facilitates tagging of the point of interest with a tag, the tag comprising a standardized string that the user establishes to label the point of interest within a larger social networking environment.

2. The computer-implemented method of claim 1, wherein the tagging action comprises at least one of:
   proposing a candidate tag for tagging the point of interest;
   prompting the user to indicate a specific tag for the point of interest; or
   tagging the point of interest with the specific tag.

3. The computer-implemented method of claim 2, wherein tagging the point of interest with the specific tag further comprises at least one of:
   tagging the point of interest with a temporary tag;
   tagging the point of interest with a permanent tag;
   tagging the point of interest with a public tag;
   tagging the point of interest with a visual tag;
   tagging the point of interest with an audio tag;
   tagging the point of interest with a private tag; or
   tagging the point of interest anonymously without revealing an identity of the user to one or more other users to which the specific tag will be accessible.

4. The computer-implemented method of claim 2, wherein proposing the candidate tag for tagging the point of interest is based on detecting, through another corresponding eye-tracking system, that an additional user has looked at the point of interest.

5. The computer-implemented method of claim 4, wherein detecting that the additional user has looked at the point of interest further comprises generating a heat map that indicates an intensity of how multiple users oriented their gazes within a vicinity corresponding to the field of view of the user.

6. The computer-implemented method of claim 1, wherein determining that the point of interest is the candidate for tagging comprises receiving input from the user indicating that the user has selected the point of interest as the candidate for tagging.

7. The computer-implemented method of claim 6, wherein receiving input from the user indicating that the user has selected the point of interest as the candidate for tagging comprises at least one of:
   receiving a vocal auditory indication from the user; or
   detecting manual selection of a button.

8. The computer-implemented method of claim 1, wherein identifying the point of interest further comprises:
   disaggregating, via an object-detection system, visual information associated with the user's field of view to detect separately identifiable objects within the user's field of view; and
   mapping the point of interest to at least a portion of one of the separately identifiable objects detected by the object-detection system.

9. The computer-implemented method of claim 1, wherein the point of interest further comprises:
   at least one point along a line corresponding to the orientation of the user's eye;
   a two-dimensional set of points indicating a planar surface within the field of view of the user; or
   a three-dimensional set of points indicating an object within the field of view of the user.

10. The computer-implemented method of claim 1, further comprising:
    detecting, using a corresponding eye-tracking system, that the user or an additional user has looked at the point of interest; and
    displaying, to the user or the additional user, the tag for the point of interest that was generated by the tagging action.

11. A system comprising:
    at least one physical processor;
    a physical memory comprising computer-executable instructions that, when executed by the physical processor, cause the physical processor to:
      determine, using an eye-tracking system, an orientation of at least one eye of a user;
      identify, based at least in part on the orientation of the user's eye, a point of interest within a field of view of the user;
      determine that the point of interest is a candidate for tagging; and
      perform, in response to determining that the point of interest is the candidate for tagging, a tagging action that facilitates tagging of the point of interest with a tag, the tag comprising a standardized string that the user establishes to label the point of interest within a larger social networking environment.

12. The system of claim 11, wherein the tagging action comprises at least one of:

proposing a candidate tag for tagging the point of interest;
prompting the user to indicate a specific tag for the point of interest; or
tagging the point of interest with the specific tag.

13. The system of claim 12, wherein tagging the point of interest with the specific tag further comprises at least one of:
   tagging the point of interest with a temporary tag;
   tagging the point of interest with a permanent tag;
   tagging the point of interest with a public tag;
   tagging the point of interest with a visual tag;
   tagging the point of interest with an audio tag;
   tagging the point of interest with a private tag; or
   tagging the point of interest anonymously without revealing an identity of the user to one or more other users to which the specific tag will be accessible.

14. The system of claim 12, wherein proposing the candidate tag for tagging the point of interest is based on detecting, through another corresponding eye-tracking system, that an additional user has looked at the point of interest.

15. The system of claim 14, wherein detecting that the additional user has looked at the point of interest further comprises generating a heat map that indicates an intensity of how multiple users oriented their gazes within a vicinity corresponding to the field of view of the user.

16. The system of claim 11, wherein determining that the point of interest is the candidate for tagging comprises receiving input from the user indicating that the user has selected the point of interest as the candidate for tagging.

17. The system of claim 16, wherein receiving input from the user indicating that the user has selected the point of interest as the candidate for tagging comprises at least one of:
   receiving a vocal auditory indication from the user; or
   detecting manual selection of a button.

18. The system of claim 11, wherein identifying the point of interest further comprises:
   disaggregating, via an object-detection system, visual information associated with the user's field of view to detect separately identifiable objects within the user's field of view; and
   mapping the point of interest to at least a portion of one of the separately identifiable objects detected by the object-detection system.

19. The system of claim 11, wherein the point of interest further comprises:
   at least one point along a line corresponding to the orientation of the user's eye;
   a two-dimensional set of points indicating a planar surface within the field of view of the user; or
   a three-dimensional set of points indicating an object within the field of view of the user.

20. A non-transitory computer-readable medium comprising one or more computer-executable instructions that, when executed by at least one processor of a computing device, cause the computing device to:
   determine, using an eye-tracking system, an orientation of at least one eye of a user;
   identify, based at least in part on the orientation of the user's eye, a point of interest within a field of view of the user;
   determine that the point of interest is a candidate for tagging; and
   perform, in response to determining that the point of interest is the candidate for tagging, a tagging action that facilitates tagging of the point of interest with a tag, the tag comprising a standardized string that the user establishes to label the point of interest within a larger social networking environment.

* * * * *